(12) United States Patent
Jeong et al.

(10) Patent No.: US 7,747,130 B2
(45) Date of Patent: Jun. 29, 2010

(54) APPARATUS AND METHOD FOR EXTRACTING REPRESENTATIVE STILL IMAGES FROM MPEG VIDEO

(75) Inventors: Dong Seok Jeong, Seoul (KR); Tae Hee Kim, Paju-si (KR)

(73) Assignee: Inha-Industry Partnership Institute, Incheon (KR)

( * ) Notice: Subject to any disclaimer, the term of this patent is extended or adjusted under 35 U.S.C. 154(b) by 1132 days.

(21) Appl. No.: 10/573,439

(22) PCT Filed: Sep. 30, 2004

(86) PCT No.: PCT/KR2004/002508

§ 371 (c)(1),
(2), (4) Date: Mar. 24, 2006

(87) PCT Pub. No.: WO2005/032132

PCT Pub. Date: Apr. 7, 2005

(65) Prior Publication Data

US 2007/0036518 A1    Feb. 15, 2007

(30) Foreign Application Priority Data

Sep. 27, 2003    (KR)    ................ 10-2003-0067176

(51) Int. Cl.
*H04N 5/91* (2006.01)
*H04N 7/00* (2006.01)
*G06K 9/00* (2006.01)
*G06K 9/36* (2006.01)
*G06K 9/46* (2006.01)

(52) U.S. Cl. .................. 386/46; 386/95; 382/168; 382/232; 382/236

(58) Field of Classification Search .................. 386/1, 386/46, 83, 95, 124–126
See application file for complete search history.

(56) References Cited

U.S. PATENT DOCUMENTS

| 6,021,434 | A | 2/2000 | Pizano |
| 6,766,098 | B1 * | 7/2004 | McGee et al. ............. 386/46 |
| 7,257,261 | B2 * | 8/2007 | Suh .......................... 382/236 |
| 7,333,712 | B2 * | 2/2008 | Jeannin et al. ............. 386/68 |
| 2003/0152363 | A1 | 8/2003 | Jeannin et al. |

FOREIGN PATENT DOCUMENTS

| JP | 1999-069281 A | 3/1999 |
| JP | 2006-261741 A | 9/2000 |
| KR | 2004-035127 A | 4/2004 |

OTHER PUBLICATIONS

Frederic Dufaux, "Key Frame Selection to Represent A Video", IEEE, pp. 275-278, 2000.
Bilge Gunsel et al., "Content-Based Video Abstraction", IEEE, pp. 128-132, 1998.

* cited by examiner

*Primary Examiner*—Marsha D Banks Harold
*Assistant Examiner*—Marc Dazenski
(74) *Attorney, Agent, or Firm*—Bachman & LaPointe, P.C.

(57) ABSTRACT

The present invention relates to an apparatus and method for extracting representative still images from Moving Picture Experts Group (MPEG) video. The apparatus includes a video curve generation unit for calculating the distances between the adjacent frames of all intra frames of input video and generating a video curve that is a cumulative curve of the distances; a video curve division unit for dividing the video curve into a certain number of segments; a still image selection unit for selecting video images corresponding to certain points of the divided video curve as representative still images; and a video output unit for outputting the still images selected by the still image generation unit. Accordingly, the present invention can summarize the video and provide representative still images to a user at high speed.

4 Claims, 5 Drawing Sheets

FIG. 5
1860th frame. 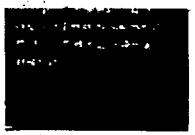
2865th frame. 
4050th frame. 
5055th frame. 
5295th frame. 
5385th frame. 
5460th frame. 
5805th frame. 
5940th frame. 
6300th frame. 
6375th frame. 
6540th frame. 
6600th frame. 
7125th frame. 
7305th frame. 
8400th frame. 
8775th frame. 
10005th frame. 
10320th frame. 
10950th frame. 
10980th frame. 
11175th frame. 
11205th frame. 
11325th frame.
11955th frame.

APPARATUS AND METHOD FOR EXTRACTING REPRESENTATIVE STILL IMAGES FROM MPEG VIDEO

TECHNICAL FIELD

The present invention relates generally to an apparatus and method for extracting the representative still images from MPEG video and, more particularly, to an apparatus and method for extracting the representative still images from MPEG video, which extracts representative still images from MPEG 1, MPEG 2 or MPEG 4 video, and provides the extracted representative still images to a user at high speed.

BACKGROUND ART

With recently developed digital technology, multimedia data, such as high-quality video or music, can be generated more easily and quickly than before. Generally, such multimedia data is characterized in that required storage capacity is considerably large and playing time is considerably long. Accordingly, in order to efficiently store, search and read such multimedia data, various technologies have been required, and related research and efforts have been conducted. As a result, the size of such multimedia data can be considerably reduced through international compression standards, such as Moving Picture Experts Group (MPEG) 1, MPEG 2 and MPEG 4 standards, and research into MPEG 7, which allows multimedia data to be efficiently read and searched, is being conducted.

In particular, a technology, which allows video having long playing time to be read at high speed, is referred to as a "video abstract." A video abstract formed of still images is referred to as a "video summary," and a video abstract including video and related audio information is referred to as "video skimming."

Since the video summary uses only still images, the video summary is characterized in that it can be generated faster than the video skimming. On the other hand, the video skimming is characterized in that it can provide more natural screens to a user using audio and textural information.

The video summary is a set of representative still images that represents the contents of video desirably, and the methods thereof are classified according to how to select the representative still images.

A method of extracting the representative still images at regular periods is disadvantageous in that some of the representative still images may be missed because the representative still images are not distributed at regular intervals.

A method of extracting one still image for each shot of video is disadvantageous in that the number of representative still images and temporal distribution are determined by the number of shots and the temporal distribution. That is, an excessively large number of still images or a very small number of still images may be selected according to the number of shots.

Such conventional methods of extracting various feature values from video and nonlinearly extracting representative still images from a feature space are characterized in that calculating time is long or irregular calculating speed according to the variation in the contents of the video.

The conventional methods as described above have problem in that processing time is too long to provide a video summary to a user at high speed, or in that it is difficult to predict the processing time of the video summary.

DISCLOSURE

Technical Problem

Accordingly, an object of the present invention is to provide an apparatus and method for extracting the representative still images from MPEG video, which can provide a desired number of representative still images at high speed and predictable speed when the representative still images for generating a video summary are extracted from the MPEG video.

Technical Solution

In order to accomplish an object, the present invention provides an apparatus for extracting the representative still images from MPEG video, including a video curve generation unit for calculating distances between adjacent frames of all intra frames of input video and generating a video curve that is a cumulative curve of the distances; a video curve division unit for dividing the video curve into a certain number of segments; a still image selection unit for selecting video images corresponding to certain points of the divided video curve as representative still images; and a video output unit for outputting the still images selected by the still image generation unit.

Furthermore, the video curve generation unit include an intra frame selection unit for selecting an intra frame from the input video; at least one Y picture selection unit for selecting only Direct Current (DC) coefficients from Discrete Cosine Transform (DCT) coefficients of a Y picture on the selected intra frame; at least one cumulative DC histogram generation unit for extracting a cumulative histogram of the DC coefficients; at least one frame distance generation unit for calculating a maximum distance between cumulative histograms of adjacent intra frames and determining the maximum distance to be a distance between two adjacent frames; and a cumulative frame distance histogram generation unit for acquiring the video curve, that is, a cumulative curve, from the distance between the adjacent frames of the selected intra frames when the distance between the adjacent frames is calculated through the Y picture selection unit, the cumulative DC histogram generation unit and the frame distance generation unit.

In order to accomplish another object, the present invention provides a method of extracting the representative still images from MPEG video, including the steps of generating a video curve, that is, a cumulative curve of distances between adjacent frames of all intra frames of input video, by calculating the distances between the frames; dividing the video curve into a certain number of segments; selecting video images corresponding to certain points of the divided video curve as the representative still images; and outputting all or some of the selected still images.

Furthermore, the step of generating the video curve include the steps of selecting an intra frame of the input video; selecting only DC coefficients from DCT coefficients of a Y picture on the selected intra frame; extracting a cumulative histogram of the DC coefficients; calculating a maximum distance between cumulative histograms of adjacent intra frames and determining the maximum distance to be a distance between two neighboring frames; and acquiring the video curve, that is, a cumulative curve of distances between neighboring frames of all selected intra frames, by calculating the distances between the adjacent frames.

DESCRIPTION OF DRAWINGS

FIG. 5 is a view showing an example of still images output according to an embodiment of the present invention.

BEST MODE

Hereinafter, the present invention is described in more detail through preferred embodiments. The embodiments are described only for illustrative purposes, and the scope of the present invention is not limited by the embodiments.

Figure 1:
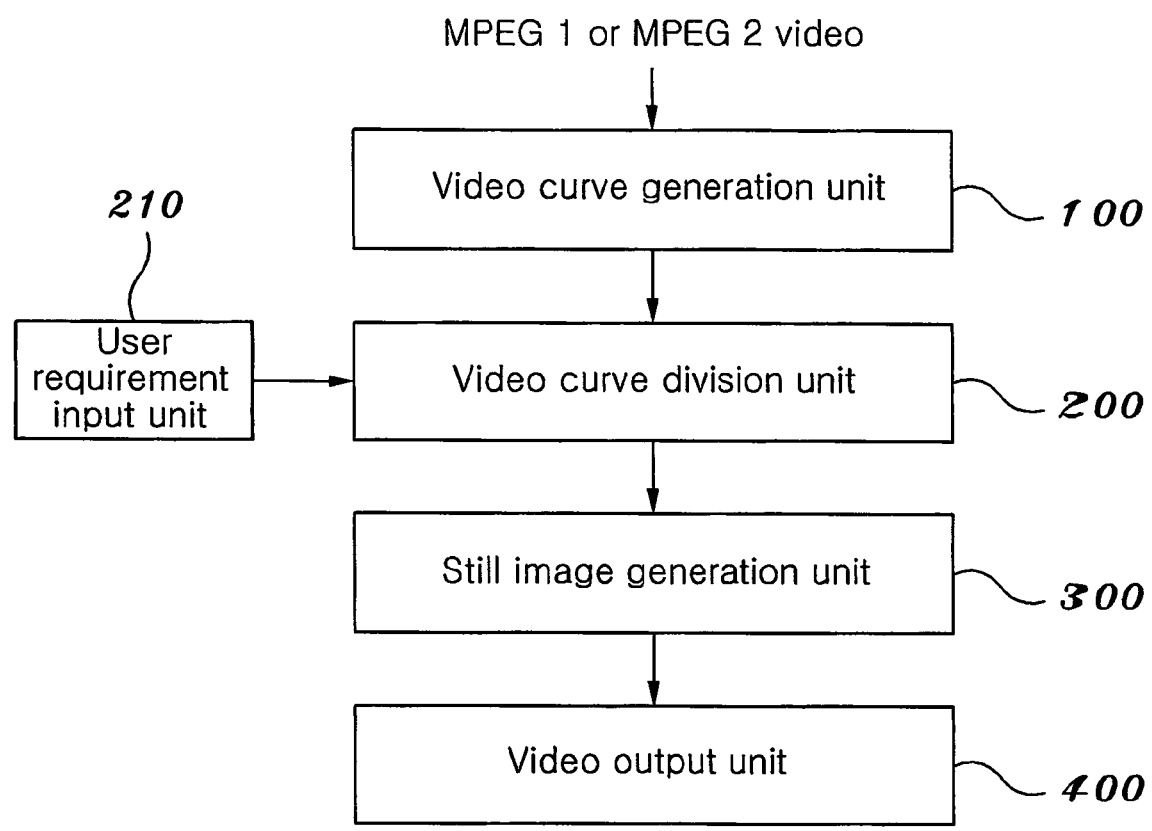
FIG. 1 is a view showing the construction of an apparatus for extracting the representative still images from MPEG video according to an embodiment of the present invention.

FIG. 1 is a view showing the construction of an apparatus for extracting the representative still images from MPEG video according to an embodiment of the present invention.

The embodiment of the present invention is described with reference to FIG. 1 below.

The apparatus for extracting the representative still images according to the present invention includes a video curve generation unit 100 for acquiring a video curve from MPEG 1, MPEG 2 or MPEG 4 video, a video curve division unit 200 for dividing the video curve into n segments (n is a natural number), a still image generation unit 300 for selecting a video scene, which corresponds to an n-th order approximation tangent point of the divided video curve, as an n-th still image, and a video output unit 400 for exhibiting selected n still images.

The video curve generation unit (video curve extraction apparatus) 100 extracts a video curve from MPEG 1, MPEG 2 or MPEG 4 video.

After the video curve has been extracted, the video curve division unit 200 receives a desired number of the representative still images from a user through a user requirement input unit 210 and divides the video curve by the desired number.

The still image generation unit 300 selects a video scene, which corresponds to an n-th order approximation tangent point of the divided video curve, as the representative still image. The number of the representative still images may be a certain number equal to or less than n.

The video output unit 400 displays the still images, which are selected by the still image generation unit, to the user.

Figure 2:
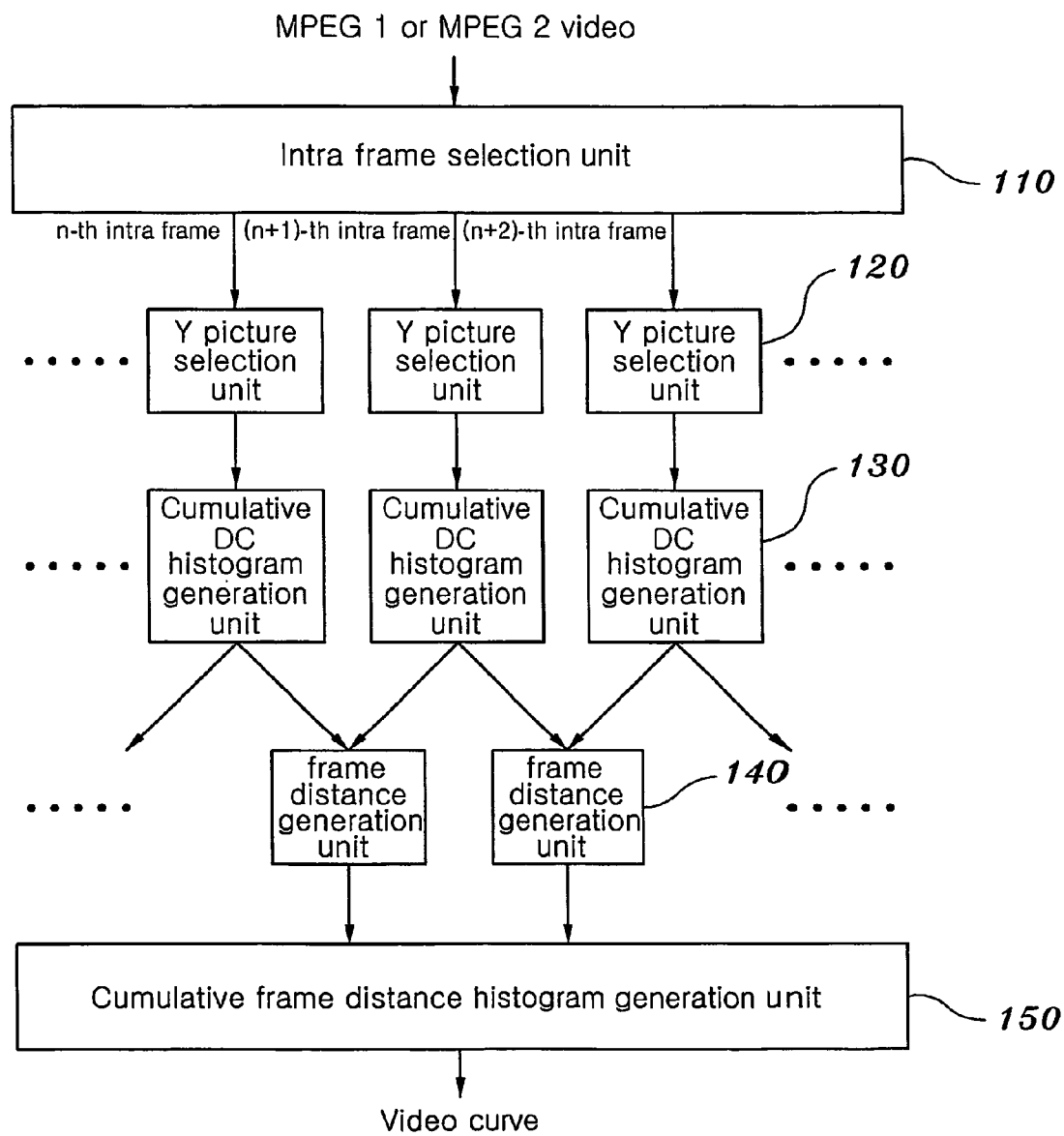
FIG. 2 is a detailed view showing the construction of the video curve generation unit of FIG. 1.

FIG. 2 is a detailed view showing the video curve generation unit 100 shown in FIG. 1.

Referring to FIG. 2, the video curve generation unit (video curve extraction apparatus) 100 includes an intra frame selection unit 110, a Y picture selection unit 120, a cumulative DC histogram generation unit 130, a frame distance generation unit 140, and a cumulative frame distance histogram generation unit 150.

The intra frame selection unit 110 selects only the intra frames of MPEG video from input MPEG video.

The Y picture selection unit 120 selects only DC(Direct Current) coefficients from the DCT(Discrete Cosine Transform) coefficients of a Y picture on the selected intra frames.

The cumulative DC histogram generation unit 130 extracts a cumulative histogram of the selected DC coefficients. In the cumulative histogram generation unit 130, the DC histogram is the frequency distribution of the DC values of pixels in the video. If it is assumed that an n-th frequency value (i.e., a DC histogram value) is H_DC(n), a cumulative histogram cH_DC(n) is determined by values H_DC(n−1) and H_DC(n).

The frame distance generation unit 140 calculates the maximum distance between the cumulative histogram and an adjacent cumulative histogram, and determines the calculated a distance between adjacent frames. In the frame distance generation unit 140, a frame distance refers to the largest value of the difference acquired by calculating the differences between the Y-axial values of two histograms according to frequencies if it is assumed that the cumulative DC histograms of neighboring still images are cH_DC(n−1) and cH_DC(n), respectively.

When the distances between the selected intra frames are calculated through the units 120-140, the cumulative frame distance histogram generation unit 150 acquires a cumulative curve from the distances. The cumulative curve is referred to as a "video curve." In the cumulative frame distance histogram generation unit 150, the cumulative frame distance histogram is acquired by cumulating the calculated frame distances using the same method used by the cumulative DC histogram generation unit 130.

Figure 3:
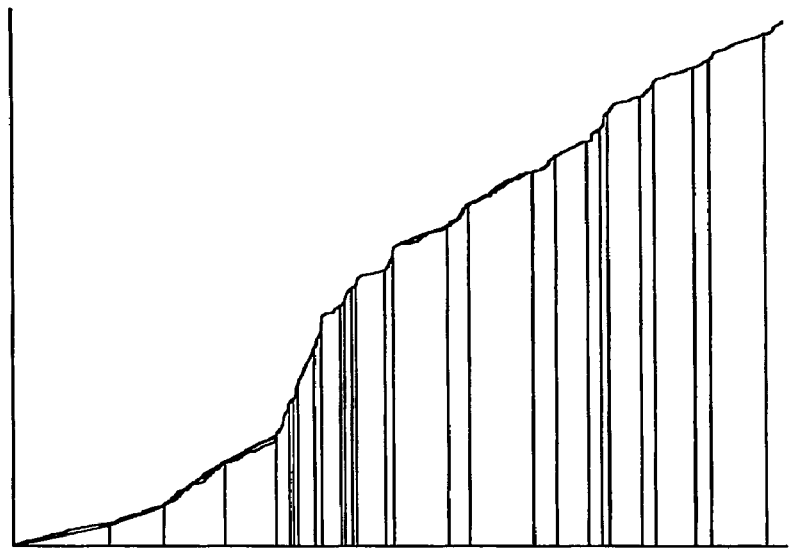
FIG. 3 is a graph showing an example of the division of a video curve according to an embodiment of the present invention.

FIG. 3 is a graph showing an example of the division of a video curve according to an embodiment of the present invention.

Referring to FIG. 3, the X-axis of the video curve corresponds to the time axis of video, and the Y-axis of the video curve corresponds to the distance between the cumulative frames.

Slopes at points of the video curve are proportional to the amount of variation in contents between frames. That is, a high-sloped section indicates the case where visual variation is very large in the video. Furthermore, a low-sloped section indicates the case where visual variation is very small in the video.

In the video curve division unit 200, the video curve acquired as described above is divided into n segments (n is a natural number). Also, the video curve may be divided into n segments by inputting the number of desired n representative still images from a user.

A line formed by connecting two end points of the video curve within each divided segment is referred to as an "approximation line." Furthermore, it is assumed that "the division of the video curve into n segments" is "the video curve is approximated with n approximation lines." Since a division method is closely related to the acquisition of an approximation tangent point, a description of the division method is made in conjunction with the approximation tangent point below.

Figure 4:
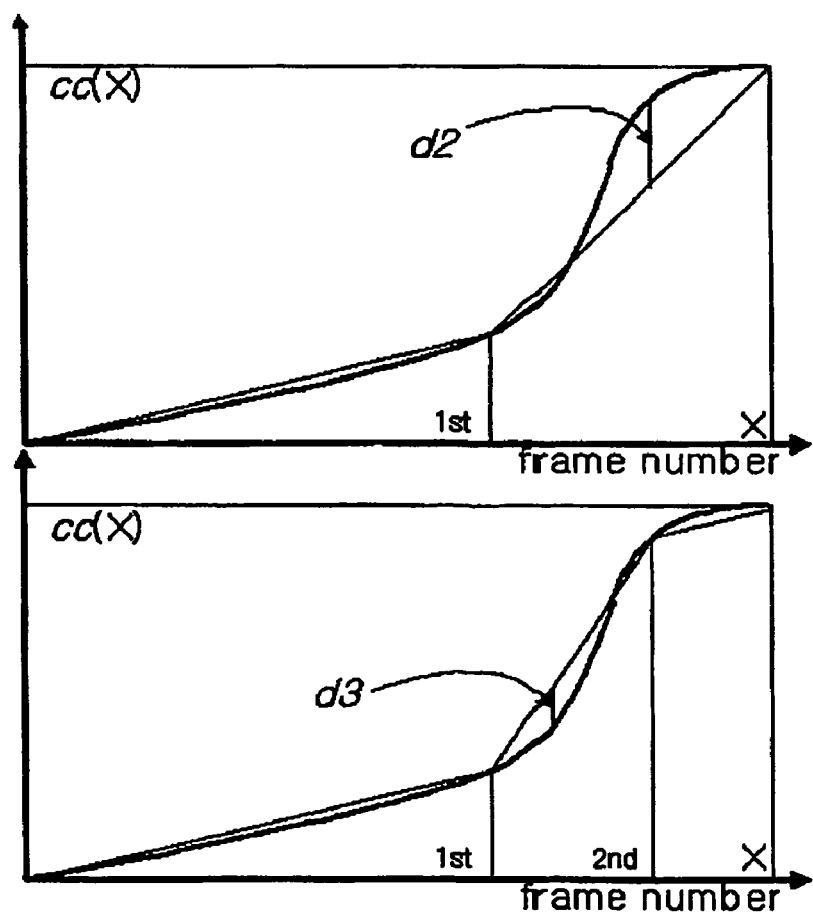
FIG. 4 is graphs showing the approximation line and the approximation tangent point of the video curve according to an embodiment of the present invention.

FIG. 4 is graphs showing the approximation line and the approximation tangent point of the video curve according to an embodiment of the present invention.

In the following description, a line formed by connecting a start point and an end point of the curve is referred to as a first-order approximation line. In FIG. 4, the first-order approximation line is a line formed by connecting the start point of a curve placed at the lowermost left corner with the end point of the curve placed at the uppermost right corner. A point on the curve farthest from the first-order approximation line is a first-order approximation tangent point. A video screen corresponding to the first-order approximation tangent point is referred to as a "first representative still image." Second-order approximation lines are lines placed on both sides of the first approximation tangent point, so that the second-order approximation lines is divided into two segments. Therefore, the video curve is divided into 2 segments. A second-order approximation tangent point is a point on the curve farthest from the two second-order approximation lines and the curve. A video screen corresponding to the second-order approximation tangent point is referred to as a "second representative still image." FIG. 4 shows an example of the second-order approximation lines, the second-order approximation tangent point d2, a third-order approximation line and a third-order approximation tangent point d3.

The video curve is divided into n segments using the above-described method, and an n-th order approximation line, an n-th order approximation tangent point and an n-th representative still image are acquired.

The maximum values of the differences between approximation lines and the Y-axial values of the video curve are obtained to match a desired number of representative still images using the method as described above, thus finally finding n representative still images.

The video curve according to the embodiment of the present invention is a rising curve the slope of which is greater than '0'. In the case of the rising curve, the distance between a video curve and an approximation line can be simply calculated using the difference between Y-axial values.

Furthermore, the present invention is characterized in that a path, which must be scanned to acquire the distance between an approximation line and a video curve, is not related to the slope variation of the curve but is proportional only to the playing time of the video, that is, the number of intra frames. That is, the scanned path is regularly maintained even though scanning is performed repeatedly, so that entire scanned paths, which are scanned until the video curve is approximated with n lines, are not related to the slope variation of the video curve but are linearly increased in proportion to the number n and the length of an X axis.

The video output unit 300 outputs the still images acquired as described above.

FIG. 5 is a view showing an example of still images output according to the embodiment of the present invention.

Figure 6:
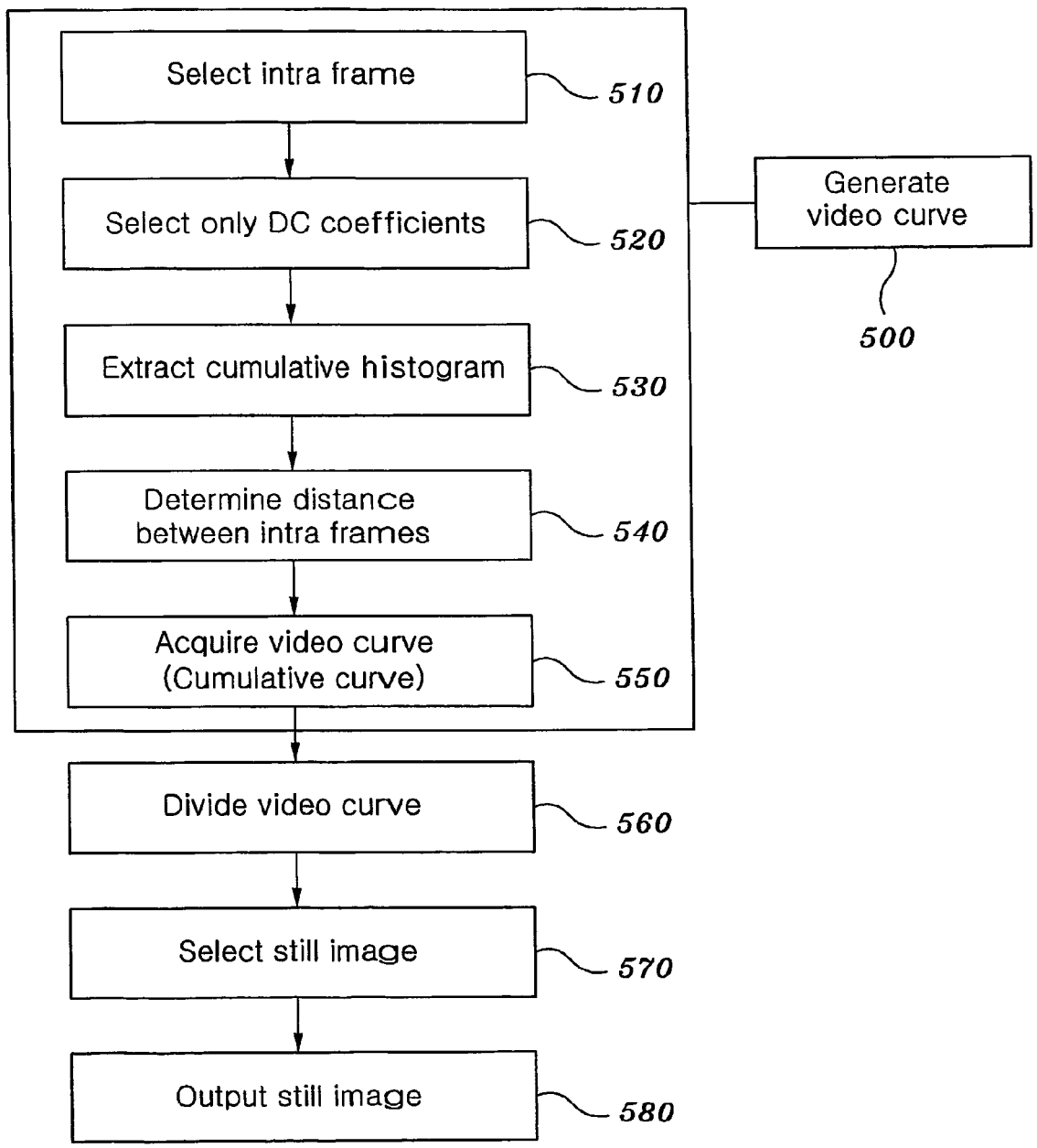
FIG. 6 is a flowchart showing a method of extracting the representative still images from MPEG video according to an embodiment of the present invention.

FIG. 6 is a flowchart showing a method of extracting video still images according to the embodiment of the present invention.

Referring to FIG. 6, the method of extracting video still images from video is performed in such a way as to select an intra frame from MPEG video at step 510. Only DC coefficients are selected from the DCT coefficients of a Y picture on the selected intra frame at step 520. A cumulative histogram of the DC coefficients is extracted at step 530. The maximum distance between two adjacent cumulative histograms is calculated and determined to be the distance between two intra frames at step 540. A video curve (cumulative curve) is acquired by calculating the distance between the frames at step 550. The video curve is divided into n segments (n is a natural number) at step 560. A video scene corresponding to the n-th order approximation tangent point of the divided video curve (n is a natural number) is selected as an n-th still image at step 570. The selected n still images are shown at step 580. All or some of still images can be shown according to necessity.

In the above description, steps 510 to 550 are the steps of extracting a video curve from the video.

INDUSTRIAL APPLICABILITY

As described above, the present invention can be generated a video summary from video, more particularly, from MPEG 1, MPEG 2 or MPEG 4 video, and provide the generated video summary to the user at high speed.

Also, the present invention can provide a desired number of representative still images to the user.

Furthermore, since processing time is not related to the variation in the contents of the video but is proportional to the number of still images desired by the user, it is possible to predict waiting time for the video summary.

The invention claimed is:

1. An apparatus for extracting representative still images from Moving Picture Experts Group (MPEG) video, comprising:
   a user requirement input unit for inputting a number n from the user to divide the video curve into n segments, where n is a positive integer;
   a video curve generation unit for calculating maximum distances between adjacent frames of all I-frames' cumulative DC histogram values of input video and generating a video curve that is a cumulative curve of the maximum distances;
   a video curve division unit for dividing the video curve into the n segments using nth-order approximation line and nth-order approximation tangent point;
   a still image selection unit for selecting video images corresponding to the nth-order approximation tangent points of the divided video curve as representative still images, where the nth-order approximation tangent points are the points on the video curve which have the maximum distances between themselves and the nth-order approximation line; and
   a video output unit for outputting the still images selected by the still image generation unit.

2. The apparatus according to claim 1, wherein the video curve generation unit comprises:
   an intra frame selection unit for selecting an intra frame from the input video;
   at least one Luminance selection unit for selecting only Direct Current (DC) coefficients from Discrete Cosine Transform (DCT) coefficients of a Luminance value(Y) on the selected intra frame;
   at least one cumulative DC histogram generation unit for extracting a cumulative histogram of the DC coefficients;
   at least one frame distance generation unit for calculating a maximum distance between cumulative histograms of adjacent intra frames and determining the maximum distance to be a distance between two adjacent frames; and
   a cumulative frame distance histogram generation unit for acquiring the video curve, that is, a cumulative curve, from the distance between the adjacent frames of the selected intra frames when the distance between the adjacent frames is calculated through the Luminance selection unit, the cumulative DC histogram generation unit and the frame distance generation unit.

3. A method of extracting representative still images from MPEG video, comprising the steps of:
   getting a number n(n is a positive integer) from user or system to choose the number of still images;

calculating maximum distances between adjacent frames of all I-frames' cumulative DC histogram values of input video;
generating a video curve that is a cumulative curve of the maximum distances;
dividing the video curve into the n segments using nth-order approximation line and nth-order approximation tangent point;
selecting video images corresponding to the nth-order approximation tangent points of the divided video curve as representative still images, where the nth-order approximation tangent points are the points on the video curve which have the maximum distances between themselves and the nth-order approximation line; and
outputting still images selected by a still image generation unit.

4. The method according to claim 3, wherein said step of generating the video curve comprises the steps of:
selecting an intra frame of the input video;
selecting only DC coefficients from DCT coefficients of a Luminance value(Y) on the selected intra frame;
extracting a cumulative histogram of the DC coefficients;
calculating a maximum distance between cumulative histograms of adjacent intra frames and determining the maximum distance to be a distance between two neighboring frames; and
acquiring the video curve, that is, a cumulative curve of distances between neighboring frames of all selected intra frames, by calculating the distances between the adjacent frames.

\* \* \* \* \*